US012572357B2

(12) United States Patent
Xie et al.

(10) Patent No.: US 12,572,357 B2
(45) Date of Patent: Mar. 10, 2026

(54) VECTOR MASK BUFFERS IN A VECTOR INSTRUCTION EXECUTION PIPELINE

(71) Applicant: Tenstorrent USA, Inc., Austin, TX (US)

(72) Inventors: Dongjie Xie, Austin, TX (US); Alexander C. Rucker, Santa Clara, CA (US)

(73) Assignee: Tenstorrent USA, Inc.

( * ) Notice: Subject to any disclaimer, the term of this patent is extended or adjusted under 35 U.S.C. 154(b) by 0 days.

(21) Appl. No.: 18/749,599

(22) Filed: Jun. 20, 2024

(65) Prior Publication Data

US 2025/0306927 A1      Oct. 2, 2025

Related U.S. Application Data

(60) Provisional application No. 63/570,822, filed on Mar. 28, 2024.

(51) Int. Cl.
*G06F 9/30* (2018.01)
(52) U.S. Cl.
CPC ...... *G06F 9/30038* (2023.08); *G06F 9/30079* (2013.01); *G06F 9/30101* (2013.01)
(58) Field of Classification Search
None
See application file for complete search history.

(56) References Cited

U.S. PATENT DOCUMENTS

| | | | | | |
|---|---|---|---|---|---|
| 9,442,733 | B2 * | 9/2016 | Toll | | G06F 9/30018 |
| 10,592,466 | B2 * | 3/2020 | Kim | | G06F 15/7839 |
| 10,628,162 | B2 * | 4/2020 | Panda | | G06F 8/4441 |
| 2007/0150697 | A1 * | 6/2007 | Sachs | | G06F 9/3455 |
| | | | | | 712/2 |
| 2008/0082785 | A1 * | 4/2008 | Jourdan | | G06F 9/30038 |
| | | | | | 712/5 |
| 2016/0224514 | A1 * | 8/2016 | Moudgill | | G06F 9/30036 |
| 2021/0216318 | A1 | 7/2021 | Langhammer et al. | | |
| 2023/0367599 | A1 | 11/2023 | Waterman et al. | | |

OTHER PUBLICATIONS

International Search Report and Written Opinion from International Application No. PCT/US25/21779 dated Jun. 6, 2025, 9 pages.
V. Guglielmi, (2020). Functional and Formal Verification on submodules of a Vector Processing Unit based on RISC-V V-extension (Doctoral dissertation, Politecnico di Torino).

* cited by examiner

*Primary Examiner* — Eric Coleman
(74) *Attorney, Agent, or Firm* — Daylight Law, P.C.

(57) ABSTRACT

Systems and methods related to vector mask buffers in a vector instruction execution pipeline are disclosed herein. The vector instruction execution pipeline may include several lanes. Each lane may include a vector register file, a vector mask buffer, and a functional processing unit. The vector register file may store operand data and the vector mask buffer may store a vector mask associated with the operand data. In a lane, the operand data may be read from the register file into a functional processing unit, and the vector mask may be read from the vector mask buffer to the functional processing unit. The functional processing unit may process the operand data based on the vector mask. The functional processing unit may process the operand data based on the vector mask. The lane-specific vector mask buffers improve the efficiency of the vector instruction execution pipeline by storing the vector masks proximate to where the vector masks will be used.

25 Claims, 9 Drawing Sheets

Mask Reg V0 401

| | lane0 | lane1 | lane2 | lane3 |
|---|---|---|---|---|
| | 0 | 64 | 128 | 192 |
| | ... | ... | ... | ... |
| | 63 | 127 | 191 | 255 | tmp vm0 8b 402

| lane0 | lane1 | lane2 | lane3 |
|---|---|---|---|
| 0 | 8 | 16 | 24 |
| ... | ... | ... | ... |
| 7 | 15 | 23 | 31 |
| 32 | 40 | 48 | 56 |
| ... | ... | ... | ... |
| 39 | 47 | 55 | 63 |
| 64 | 72 | 80 | 88 |
| ... | ... | ... | ... |
| 71 | 79 | 87 | 95 |
| 96 | 104 | 112 | 120 |
| ... | ... | ... | ... |
| 103 | 111 | 119 | 127 |
| 128 | 136 | 144 | 152 |
| 135 | 143 | 151 | 159 |
| 160 | 168 | 176 | 184 |
| ... | ... | ... | ... |
| 167 | 175 | 183 | 191 |
| 192 | 200 | 208 | 216 |
| ... | ... | ... | ... |
| 199 | 207 | 215 | 223 |
| 224 | 232 | 240 | 248 |
| ... | ... | ... | ... |
| 231 | 239 | 247 | 255 | tmp vm1 16b 403

| lane0 | lane1 | lane2 | lane3 |
|---|---|---|---|
| 0 | 4 | 8 | 12 |
| ... | ... | ... | ... |
| 3 | 7 | 11 | 15 |
| 16 | 20 | 24 | 28 |
| ... | ... | ... | ... |
| 19 | 23 | 27 | 31 |
| 32 | 36 | 40 | 44 |
| ... | ... | ... | ... |
| 35 | 39 | 43 | 47 |
| 48 | 52 | 56 | 60 |
| ... | ... | ... | ... |
| 51 | 55 | 59 | 63 |
| 64 | 68 | 72 | 76 |
| 67 | 71 | 75 | 79 |
| 80 | 84 | 88 | 92 |
| ... | ... | ... | ... |
| 83 | 87 | 91 | 95 |
| 96 | 100 | 104 | 108 |
| 99 | 103 | 107 | 111 |
| 112 | 116 | 120 | 124 |
| 115 | 119 | 123 | 127 | tmp vm2 32b 404

| lane0 | lane1 | lane2 | lane3 |
|---|---|---|---|
| 0 | 2 | 4 | 6 |
| 1 | 3 | 5 | 7 |
| 8 | 10 | 12 | 14 |
| 9 | 11 | 13 | 15 |
| 16 | 18 | 20 | 22 |
| 17 | 19 | 21 | 23 |
| 24 | 26 | 28 | 30 |
| 25 | 27 | 29 | 31 |
| 32 | 34 | 36 | 38 |
| 33 | 35 | 37 | 39 |
| 40 | 42 | 44 | 46 |
| 41 | 43 | 45 | 47 |
| 48 | 50 | 52 | 54 |
| 49 | 51 | 53 | 55 |
| 56 | 58 | 60 | 62 |
| 57 | 59 | 61 | 63 | tmp vm3 64b 405

| lane0 | lane1 | lane2 | lane3 |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | 25 | 26 | 27 |
| 28 | 29 | 30 | 31 |

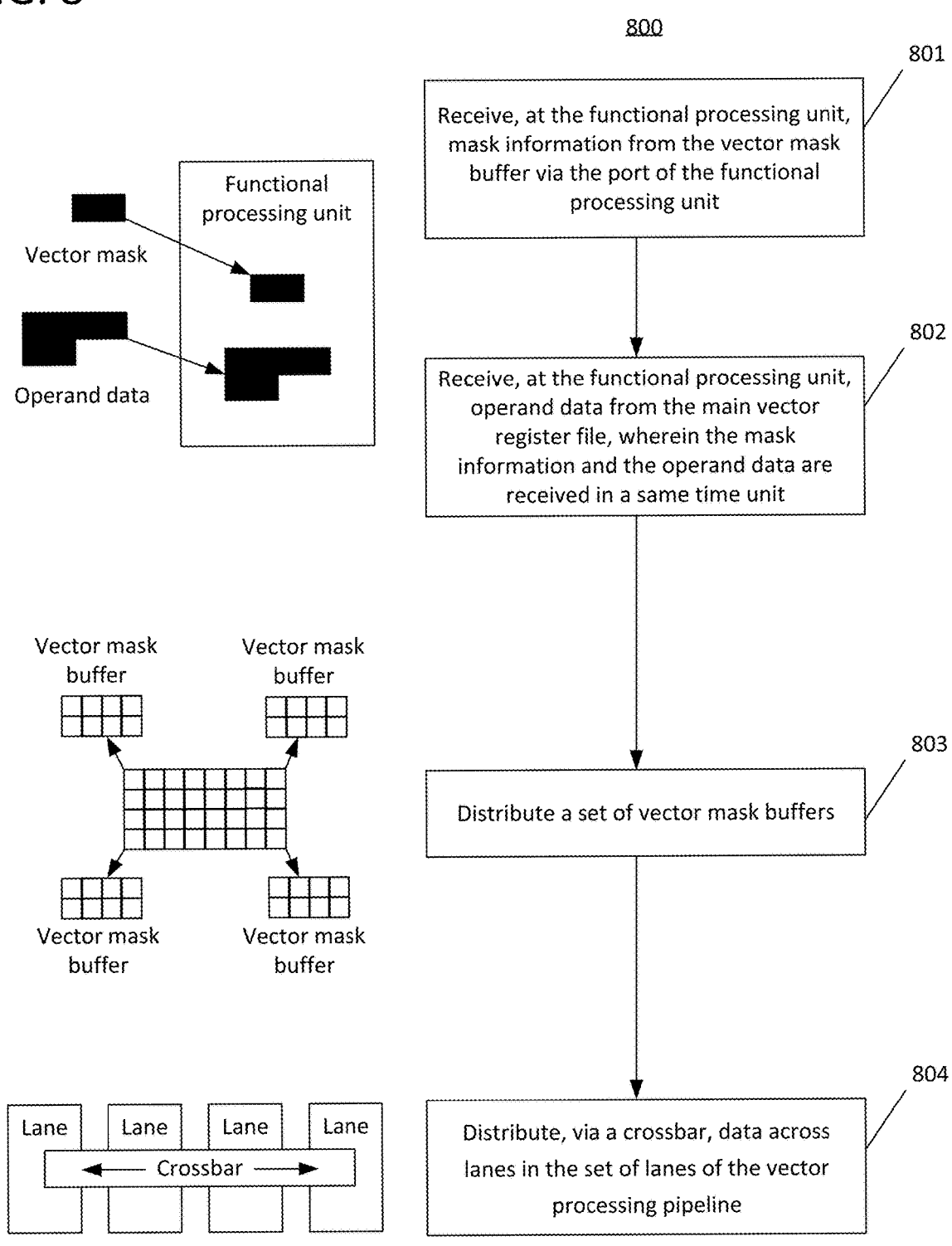

801

Receive, at the functional processing unit, mask information from the vector mask buffer via the port of the functional processing unit

802

Receive, at the functional processing unit, operand data from the main vector register file, wherein the mask information and the operand data are received in a same time unit

803

Distribute a set of vector mask buffers

804

Distribute, via a crossbar, data across lanes in the set of lanes of the vector processing pipeline

Figure 9:
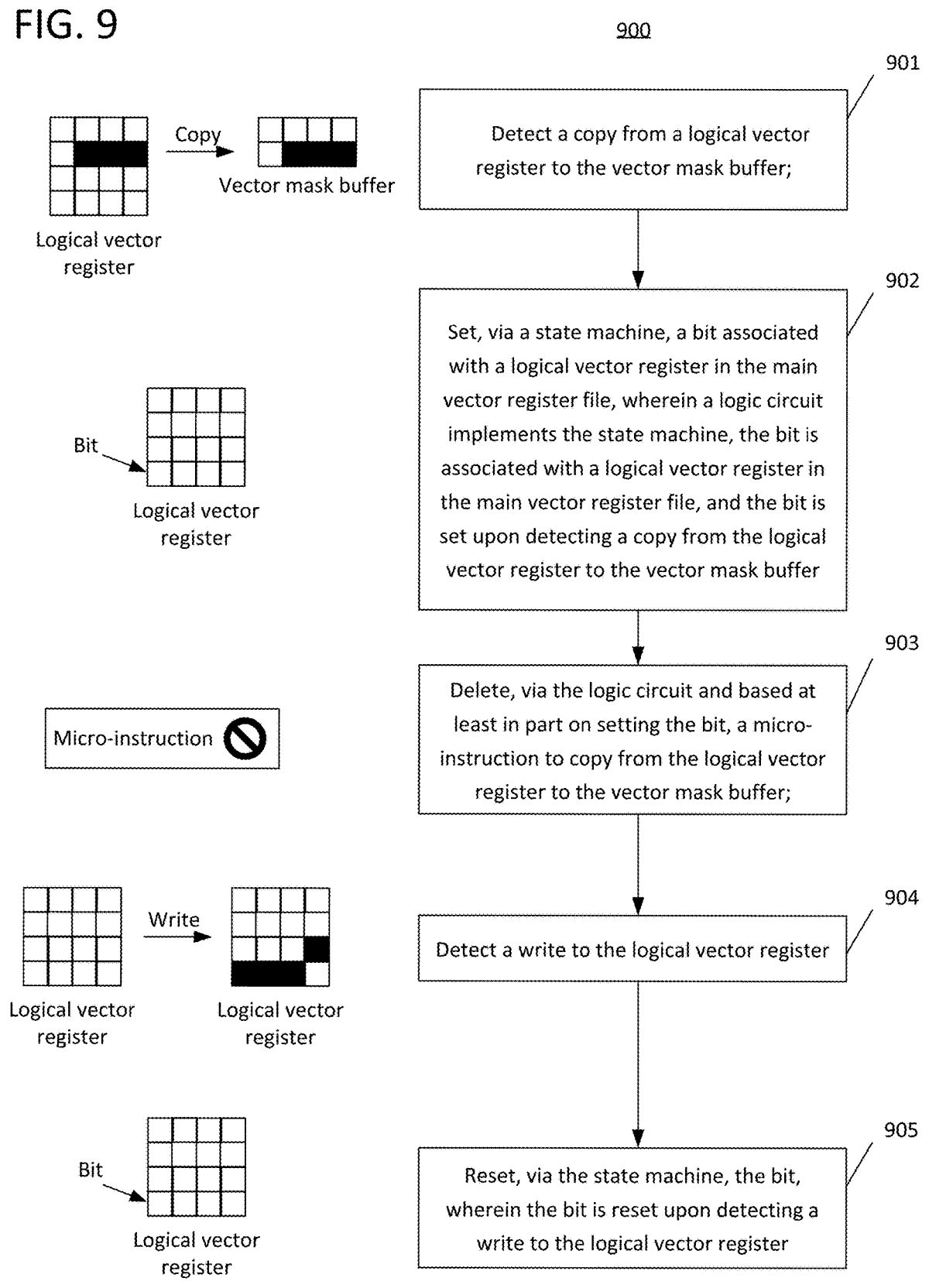

Logical vector register → Copy → Vector mask buffer

Bit → Logical vector register

Micro-instruction 🚫

Logical vector register → Write → Logical vector register

Bit → Logical vector register

901
Detect a copy from a logical vector register to the vector mask buffer;

902
Set, via a state machine, a bit associated with a logical vector register in the main vector register file, wherein a logic circuit implements the state machine, the bit is associated with a logical vector register in the main vector register file, and the bit is set upon detecting a copy from the logical vector register to the vector mask buffer 903
Delete, via the logic circuit and based at least in part on setting the bit, a micro-instruction to copy from the logical vector register to the vector mask buffer;

904
Detect a write to the logical vector register

905
Reset, via the state machine, the bit, wherein the bit is reset upon detecting a write to the logical vector register

VECTOR MASK BUFFERS IN A VECTOR INSTRUCTION EXECUTION PIPELINE

CROSS REFERENCE TO RELATED APPLICATIONS

This application claims the benefit of U.S. Provisional Patent Application No. 63/570,822, filed Mar. 28, 2024, which is incorporated by reference herein in its entirety for all purposes.

BACKGROUND

Processing pipelines tailored for vector data, in contrast to those optimized for scalar data, exhibit distinct architectural characteristics. In vector-centric pipelines, emphasis is placed on efficiently handling bulk data sets by leveraging parallel processing capabilities inherent in vector operations. These pipelines are meticulously designed to harness the power of SIMD (Single Instruction, Multiple Data) instructions, allowing for simultaneous execution of operations on multiple data elements within a vector. Unlike scalar-centric counterparts, where instructions operate on individual data elements sequentially, vector pipelines streamline computational tasks by orchestrating operations across entire vectors in a synchronized fashion. This design paradigm enhances throughput and performance, particularly in data-intensive applications such as multimedia processing, scientific simulations, and machine learning algorithms, where large-scale data manipulation is paramount. Moreover, vector pipelines often incorporate specialized units and memory architectures optimized for vector processing, further augmenting their efficiency and versatility in diverse computational domains.

In conjunction with vector processing pipelines, vector masks serve as indispensable tools for controlling and directing computations with precision and flexibility. These masks, which are generally comprised of Boolean values, enable selective execution of operations within vector instructions, allowing for conditional processing based on specified criteria. The Boolean values may be either "1" to indicate that an instruction will be executed with respect to a portion of the vector or "0" to indicate that said portion of the vector will be ignored for purposes of conducting an instruction. By applying masks to vector operations, processors may efficiently handle irregular data patterns or perform conditional branching within vectorized algorithms. This capability is particularly advantageous in scenarios where not all data elements within a vector require the same computation or where conditional execution paths are dictated by dynamic runtime conditions. Vector masks seamlessly integrate into the vector processing pipeline, providing a mechanism for fine-grained control over data flow and computation, thereby enhancing the efficiency and versatility of vectorized algorithms across a spectrum of applications.

SUMMARY

This disclosure relates to vector mask buffers in a vector instruction execution pipeline. The vector instruction execution pipeline may include several lanes, a crossbar interconnect between lanes, a load store unit, and data on which to perform the instructions. Each lane may be associated with a vector register file, a vector mask buffer, and a functional processing unit. In each lane, the associated register file may store data (e.g., operand data) on which the functional processing unit will perform operations. The data and vector mask information from the associated vector mask buffer may be read into the functional processing unit. The functional processing unit may, based on the vector mask information, determine whether or not to perform operations on the data. The vector mask (e.g., vector mask data, vector mask information) may be stored in a vector mask buffer, and each vector mask buffer may be associated with a lane in the vector instruction execution pipeline. The vector mask information in each vector mask buffer of a lane may be specific to the operand data associated with that lane. The vector mask buffers of each lane efficiently store the vector mask close to the functional processing unit that will use it.

In specific embodiments of the invention, a vector processing pipeline is provided. The vector processing pipeline comprises: a main vector register file storing operand data and having a read port; a vector mask buffer storing a vector mask, wherein the vector mask is associated with the operand data; and a functional processing unit coupled to the main vector register file via the read port and coupled to the vector mask buffer.

In specific embodiments of the invention, a method for vector processing is provided. The method comprises: storing operand data in a main vector register file; storing a vector mask in a vector mask buffer, wherein the vector mask is associated with the operand data; reading, via a read port coupled with a functional processing unit and with the main vector register file, the operand data stored in the main vector register file; reading the vector mask stored in the vector mask buffer; and processing, via the functional processing unit, the operand data based at least in part on the vector mask.

In specific embodiments of the invention, a vector processing pipeline is provided. The vector processing pipeline comprises: a main vector register file storing operand data; a functional processing unit; one or more first read ports associated with the main vector register file and coupled with the functional processing unit; a vector mask buffer storing a vector mask, wherein the vector mask is associated with the operand data; and one or more second read ports associated with the vector mask buffer and coupled with the functional processing unit.

BRIEF DESCRIPTION OF THE DRAWINGS

The accompanying drawings illustrate various embodiments of systems, methods, and other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 4 provides an example of contents of a set of vector mask buffers and corresponding vector mask registers in accordance with specific embodiments of the inventions disclosed herein.

FIG. 8 provides a method for vector processing, which may be a continuation of the method in FIG. 7, in accordance with specific embodiments of the inventions disclosed herein.

FIG. 9 provides a method for vector processing, which may be a continuation of the method in FIG. 7, FIG. 8, or FIG. 7 and FIG. 8, in accordance with specific embodiments of the inventions disclosed herein.

DETAILED DESCRIPTION

Figure 1:
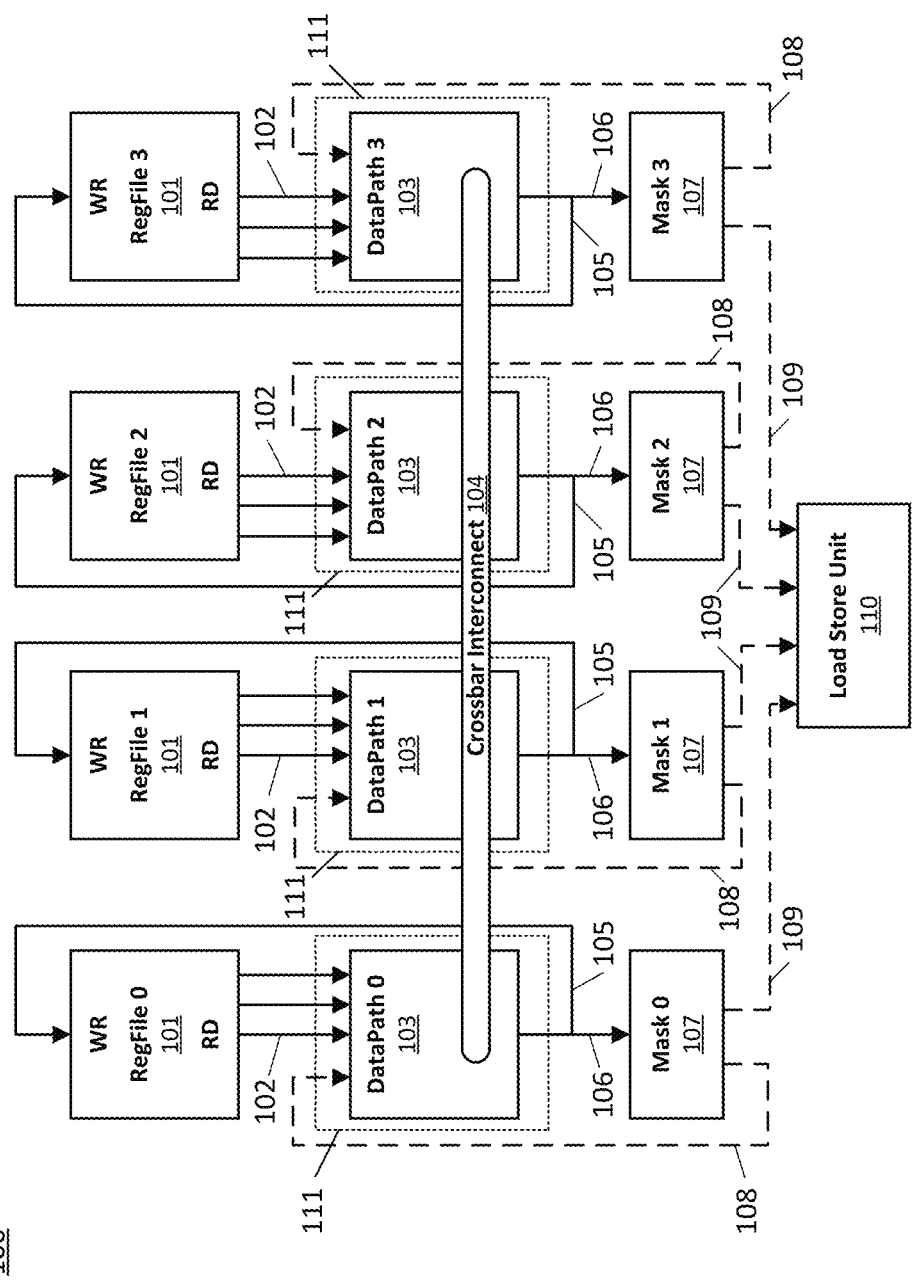
FIG. 1 provides a vector processing pipeline in accordance with specific embodiments of the inventions disclosed herein.

Systems and methods related to vector masks in vector processing pipelines are disclosed herein. In specific architectures, the values of a vector mask are stored in a main vector register file of a vector processing pipeline. In specific architectures, the vector mask is stored in the main vector register file in a register which may be referred to as the vector mask register. The main vector register file is the general workspace of the vector processing pipeline and is used for numerous purposes. For example, the main vector register file may be used for temporary data storage, operand fetching, result storage, and for storing and retrieving vector mask values. Specific embodiments of the inventions disclosed herein introduce one or more separate data structures, that are referred to herein as vector mask buffers, which are separate from the main vector register file of the vector processing pipeline. As used herein, the term main vector register file refers to a collection of registers that are commonly accessed through a set of read ports that are distinct from the read port or read ports which are used to access data from the vector mask buffers.

Specific embodiments disclosed herein are directed to architectures in which circuit level optimization of physical registers within the main vector register file are not possible or not practical, and a separate optimized structure such as the vector mask buffers disclosed herein are utilized for such optimizations. For example, the physical registers may be renamed, using a process called register renaming, and used in out-of-order execution. In such approaches, there is not a single specific physical register in the main register file that is dedicated for a specific architectural register (e.g., a vector mask register). In non-renamed vector implementations that execute instructions in order, the vector mask register may be physically optimized at a circuit level to specifically improve the fetching of vector mask values, including without limitation the addition of an additional read port or permutation circuitry. However, out-of-order execution with register renaming is commonly used in vector implementations to improve throughput and hide the latency of memory accesses. In renamed implementations, the vector mask register may be renamed to any physical register, precluding circuit-level optimizations.

Using one or more vector mask buffers provides significant benefits in various embodiments of the inventions disclosed herein. In particular, specific embodiments result in alleviated hardware requirements for the main vector register file in terms of a decrease in the number of required read ports which reduces the area cost of the vector processing pipeline, fewer reads and writes to the main vector register file, the potential for caching of the vector mask values in the vector mask buffers to result in faster delivery of the required values and thereby faster execution of vector instructions, and other benefits that will be apparent to those of ordinary skill in the art upon obtaining an understanding of the teachings herein.

FIG. 1 illustrates vector processing pipeline 100 which exhibits some of the principles of the embodiments described herein. The vector processing pipeline includes four lanes 111 of functional processing units which are referred to as DataPaths 103 in the figure. Lanes 111 are connected by crossbar 104. Micro-operations may allow for the distribution of data across lanes 111 using crossbar 104. As illustrated, each lane 111 is associated with a different main vector register file bank 101. Data is read from main vector register file bank 101 by lanes 111 using three read ports 102 per lane 111. The output data of the operations conducted by lanes 111 may then be written back to main vector register file bank 101. Load store unit 110 may be tasked with moving data from a memory (e.g., a cache memory) to main vector register file bank 101 for processing and moving data from main vector register file bank 101 back to the memory when the processing is complete. Vector processing pipeline 100 includes vector mask buffers 107 associated with each lane 111. Vector mask buffers 107 may exhibit the characteristics of vector mask buffers described in the embodiments herein. Vector mask buffers 107 may be distributed across lanes 111 in a one-to-one correspondence. Vector processing pipelines may be organized such that each lane 111 is associated with one vector mask buffer 107. Vector mask buffers 107 can each store vector mask data which comprises a distributed vector mask. The distributed vector mask can be distributed from the main vector register file banks 101 to be stored in a different layout in the vector mask buffers 107 by routing the vector mask data through crossbar 104.

Vector processing pipeline 100 may include a main vector register file bank 101, a vector mask buffer 107, and a functional processing unit (e.g., DataPath 103). The main vector register file bank 101 may store operand data and may have one or more read ports 102. The vector mask buffer 107 may store a vector mask, and the vector mask may be associated with the operand data. The functional processing unit may be coupled to the main vector register file bank 101 (e.g., via the one or more read ports 102) and may also be coupled to the vector mask buffer 107. The main vector register file bank 101 may have (e.g., include) a set of registers including a vector mask register. The vector mask buffer 107 may have (e.g., include, store) a set of entries. The data width of the set of registers of the main vector register file bank 101 may be larger than the data width of the set of entries of the vector mask buffer 107.

In specific embodiments, vector mask buffer 107 in FIG. 1 may be written to via lanes 111. As illustrated, write back path 105 to main vector register file bank 101 from lane 111 includes an additional connection, connection 106, to vector mask buffer 107. Accordingly, vector mask data may be read from main vector register file bank 101 to lane 111 and then written to vector mask buffer 107 in a first time step. In this operation, the vector mask data may also be distributed across lanes 111 to different vector mask buffers 107 using the crossbar 104 interconnect. In specific embodiments, the crossbar can route the vector mask data to different lanes so that it can be written to the vector mask buffers in a similar manner to the way that a crossbar is used to route operand data to different lanes to be written back to the main register file. Subsequently, in a second time step, lanes 111 may pull three operands from main vector register files bank 101 using three read ports 102 per lane 111 at the same time they pull vector mask data from vector mask buffers 107 using a port 108 (e.g., a read port, a write back port) from vector mask buffers 107. Port 108 may be a port of the functional processing unit. Vector mask buffer 107 may be coupled with the functional processing unit via port 108. Accordingly, main vector register file bank 101 may include fewer read ports than a conventional vector processing pipeline with otherwise equivalent capabilities in terms of operation execution. Micro-operations may conduct the required data movement between main vector register file bank 101, lanes 111, crossbar 104, and vector mask buffer 107.

In specific embodiments of the invention, vector mask buffers 107 are coupled with (e.g., connected to) load store unit 110 via connections 109. Accordingly, the vector mask data is readily available to the load store unit 110 without having to execute (e.g., while refraining from executing) a read from main vector register file bank 101. Load store unit 110 may access one entry of vector mask buffer 107 to mask a set of data to be stored or loaded and the functional processing units (e.g., DataPath 103) may access a different entry of vector mask buffer 107 to process the associated data. Alternatively, the same entry of vector mask buffer 107 may be reused to mask the processing and the storing and loading of the data. In either of these embodiments, vector mask buffer 107 provides significant benefits in terms of either increasing the efficiency of delivery of the required mask data or reducing the overall number of reads from main vector register file bank 101.

In specific embodiments of the inventions disclosed herein, a given vector processing pipeline 100 may include multiple vector mask buffers 107 that are distributed across vector processing pipeline 100. Vector mask buffers 107 may be efficiently distributed through vector processing pipeline 100 to increase the efficiency of execution of instructions by vector processing pipeline 100. For example, in embodiments in which vector processing pipeline 100 includes multiple sets of functional processing units (e.g., DataPaths 103) for operating on the vector operands (e.g., operand data) of vector processing pipeline 100, vector mask buffers 107 may be distributed in proximity to those multiple sets of functional processing units. The sets of functional processing units may be referred to as lanes 111 of vector processing pipeline 100. In specific embodiments, vector mask buffers 107 may be in a set of vector mask buffers 107 and lanes 111 may be in a set of lanes 111. The set of vector mask buffers 107 and the set of lanes 111 may have the same cardinality, and vector mask buffers 107 may be arranged proximate to lanes 111 in a one-to-one correspondence. In these embodiments, vector mask data that is associated with the operand data may be distributed to vector mask buffers 107 that are proximate to the functional processing units that will operate on the associated operand data. The result is more efficient execution of instructions by vector processing pipeline 100 as the portion of mask data has been distributed to where it will be used ex ante. This reduces micro-operations to shuffle data from the mask register to where the mask data will be used as part of the execution of a given instruction.

Figure 2:
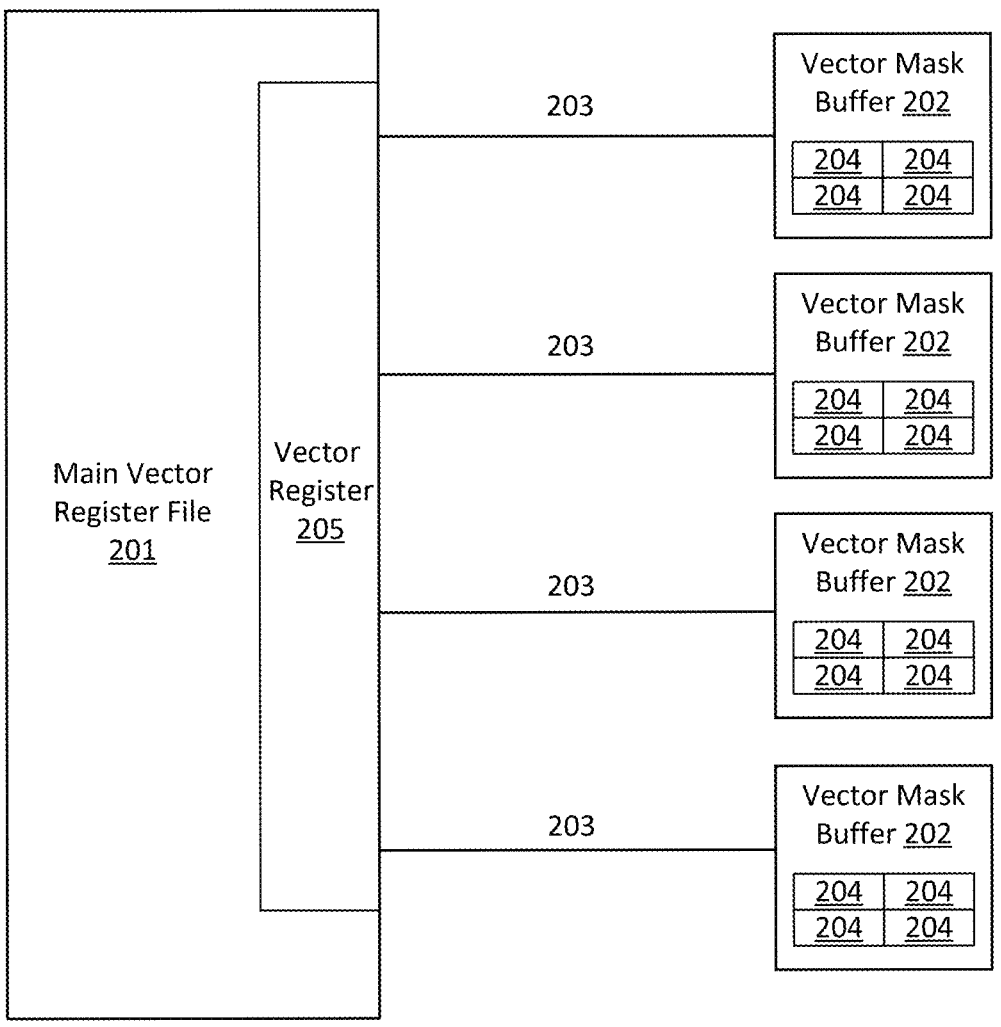
FIG. 2 provides a system in accordance with specific embodiments of the inventions disclosed herein.

FIG. 2 illustrates a system 200 that may be incorporated into vector processing pipeline 100. System 200 includes main vector register file 201, vector mask buffers 202, connections 203, entries 204, and vector register 205. Main vector register file 201 includes vector register 205. Connections 203 couple each vector mask buffer 202 with main vector register file 201, including vector register 205. Vector mask buffers 202 store values in entries 204. Although four entries 204 are shown in vector mask buffer 202, any quantity of entries 204 are possible.

In various embodiments of the inventions disclosed herein, vector mask buffers 202 may be formed of different memory technologies or storage elements. Vector mask buffers 202 may be formed of various storage elements such as latch-based registers, flip-flops, clocked storage elements, or custom-designed memory cells optimized for performance, power efficiency, or area constraints. In alternative embodiments, vector mask buffers 202 may be formed of static random-access memory (SRAM). In general, vector mask buffers 202 may be formed of the same memory technology or storage elements used for the main vector register file 201 of system 200 (e.g., a vector processing pipeline), or faster memory than the main vector register file 201.

In specific embodiments of the invention, vector mask buffers 202 may have multiple entries 204 that are available to store vector mask data as it is loaded. As such, vector mask buffer 202 may store multiple values from vector register 205 of main vector register file 201. These entries 204 may be separately addressable such that functional processing units may be provided with specific stored vector mask data for a given operation at a given time. The ability to store multiple entries 204 provides benefits in terms of the ability of each vector mask buffer 202 to be a smaller data structure than main vector register file 201 and to cache vector mask data. System 200 may include a set of pointers or tags which are stored in association with the vector mask data in order for system 200 to keep track of what vector mask data is stored in which entry 204 of vector mask buffers 202.

In specific embodiments of the inventions disclosed herein, vector mask buffers 202 may be smaller data structures, in terms of the width of the data structures, as compared to the entries of main vector register file 201. For example, main vector register file 201 may contain a set of 64-bit registers and vector mask buffer 202 may comprise a set of 32-bit or smaller entries. The smaller data structures consume less area in the vector processing pipeline and will be less costly to read as compared to larger data structures. Data structures may be smaller depending on the characteristics of how mask bits are used by system 200 (e.g., a vector processing pipelines) and the fact that the size of the data elements in a vector processing pipeline may be variable in a given vector processing pipeline.

In general, there are more data bits than there are mask bits. This is because each mask bit is used to mask one data element, and data elements are generally larger than one bit. For example, each data element may be 8-bits such that there is a 1:8 ratio of mask bits to data bits. Accordingly, a 64-bit vector mask register in main vector register file 201 may contain enough mask bits for eight 64-bit operands in the main vector register file 201. As such, the functional processing units of a vector processing architecture will consume data bits at a higher rate than mask bits are consumed. Therefore, vector mask buffer 202 may store mask bits in smaller entries 204 and multiple reads from vector mask buffer 202 may be used to obtain the mask data as it is needed for multiple operations.

In specific embodiments, the vector mask buffers 202 may be reused for purposes other than storing vector mask data, such as for executing instructions with more operands than there are read ports from the main vector register file to the functional processing units. For example, if there were three read ports, and the vector processing pipeline was generally configured to execute three operand instructions, an instruction requiring four operands and no mask may be conducted by loading the fourth operand into the vector mask buffer 202. In a very specific example, to support a reduced instruction set computing — five (RISC-V) segment load, an 8-input transpose operation is needed. The transpose may be constructed from a 4-input micro-operation and a 2-input micro-operation. The 4-input micro-operation may not use (e.g., never uses) a mask in this implementation. Accordingly, the 4-input transpose operation may re-use the vector mask buffer for the fourth input.

Figure 3:
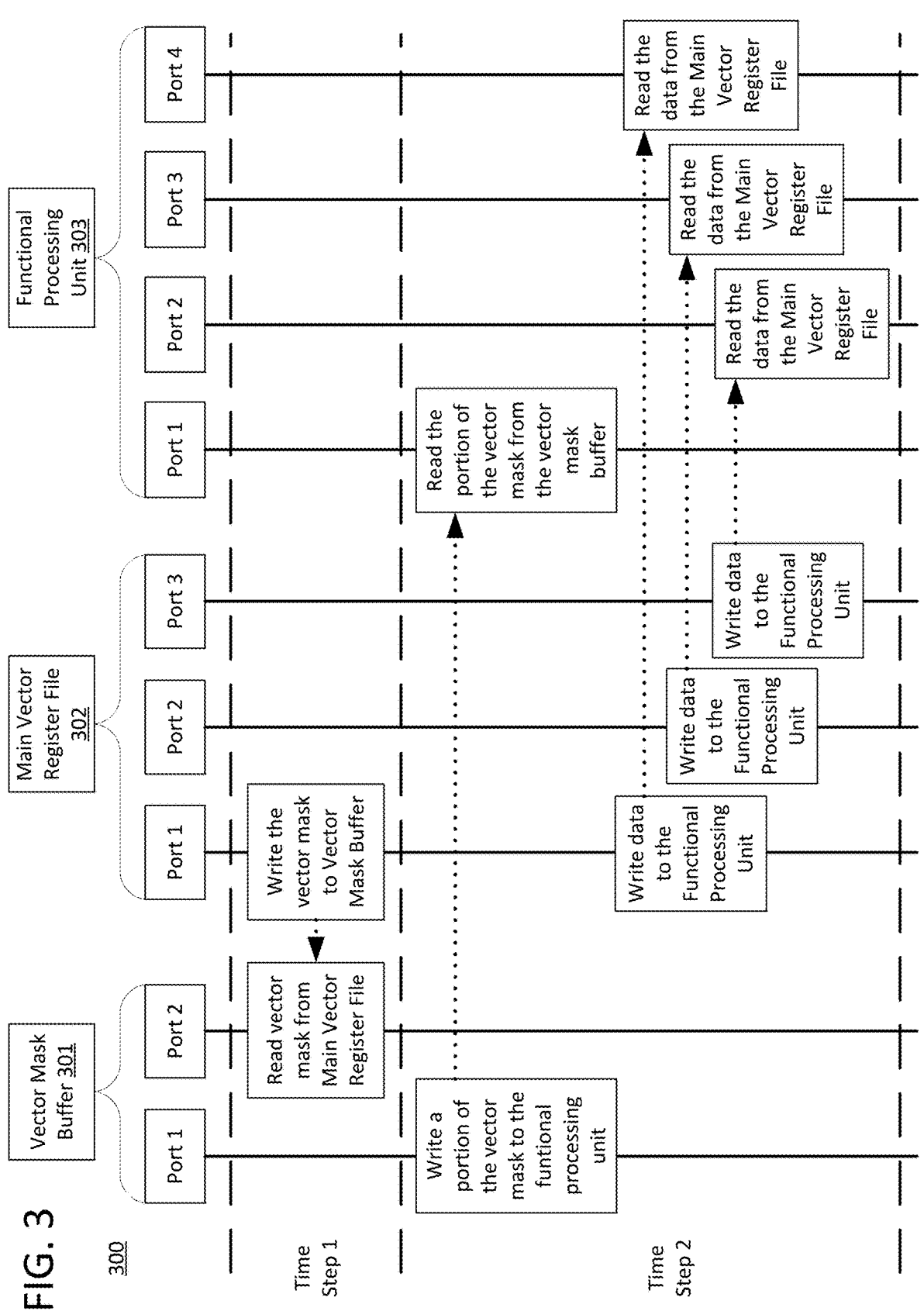
FIG. 3 provides an example of a timing diagram in relation to a system in accordance with specific embodiments of the inventions disclosed herein.

FIG. 3 illustrates an example of a timing diagram in relation to system 300. System 300 may include features of vector processing pipeline 100 and system 200. System 300 may incorporate features of vector instruction execution pipelines as described herein. System 300 may include vector mask buffer 301 (e.g., having two ports), main vector register file bank 302 (e.g., having three ports), and functional processing unit 303 (e.g., having four ports).

In specific embodiments of the inventions disclosed herein, vector mask buffer 301 may be a separate structure from main vector register file bank 302 and may reduce the number of read ports required for main vector register file bank 302. In these embodiments, the vector mask may be read from main vector register file bank 302 and stored in vector mask buffer 301 in a first time step. In some embodiments, this copy operation may involve using functional processing unit 303 to permute the mask value. The vector mask may be read from main vector register file bank 302 on a port (e.g., port 1, a read port). Then, in a second time step, the vector mask may be read from vector mask buffer 301 and stored by functional processing unit 303. Additionally, in the second time step (e.g., while the vector mask is read from vector mask buffer 301), data is read from main vector register file bank 302 and stored by functional processing unit 303. The data may be read from main vector register file bank 302 using that same (e.g., shared) port that was previously (e.g., in the first time step) used to write the vector mask to vector mask buffer 301 (e.g., port 1, the read port). Accordingly, an operation that utilizes the data and the vector mask to execute the operation may do so during the second time step while reducing the number of read ports for main vector register file bank 302 to achieve a same or greater efficiency.

In a specific example, main vector register file bank 302 may have three read ports and one of them may be used to read the vector mask for storage in vector mask buffer 301 in the first time step. Functional processing unit 303 of the system 300 (e.g., the vector processing pipeline) may then be able to conduct a three-operand instruction, by pulling those operands from main vector register file bank 302 using the three read ports (e.g., functional processing unit 303 port 2, port 3, and port 4), and read the mask using a separate connection (e.g., functional processing unit 303 port 1) to vector mask buffer 301 (e.g., vector mask buffer port 1) in the second time step. In specific embodiments, vector mask buffer 301 may be a smaller data structure than main vector register file bank 302 in terms of the width of each entry in the data structures such that the connection (e.g., vector mask buffer port 1 and functional processing unit port 1) from the vector mask buffer 301 to the functional processing unit 303 is smaller than a corresponding read port (e.g., main vector register file bank 302 port 1, port 2, or port 3, and functional processing unit port 2, port 3, or port 4) of the main vector register file bank 302.

In specific embodiments of the invention, vector mask buffer 301 may cache vector masks that are used for multiple instructions or multiple micro-operations emitted by decoding one instruction. Accordingly, the vector mask data will not need to be repeatedly read from main vector register file bank 302 multiple times and may instead be delivered from vector mask buffer 301 directly to functional processing unit 303. This approach may provide certain benefits such as in embodiments where the vector mask data is read from a shared read port because the operation conducted in the first time step may be skipped since the vector mask data is already available in vector mask buffer 301. This approach may also generally provide certain benefits anytime vector mask buffer 301 is faster than main vector register file bank 302 or any time vector mask buffer 301 is more efficiently distributed through the vector processing pipeline relative to functional processing unit 303 so that reading from vector mask buffer 301 is more efficient.

In specific embodiments, vector mask buffer 301 may be reused for other purposes such as for executing instructions with more operands than there are read ports from main vector register file bank 302 to functional processing unit 303. For example, if there were three read ports (e.g., functional processing unit port 2, port 3, and port 4), and the vector processing pipeline was generally configured to execute three operand instructions, an instruction requiring four operands and no mask may be conducted by loading the fourth operand into vector mask buffer 301. The fourth operand may then be sent to the functional processing unit 303 via functional processing unit 303 port 1. In a very specific example, to support a RISC-V segment load, an 8-input transpose operation may be configured. The transpose may be constructed from a 4-input micro-operation and a 2-input micro-operation. The 4-input micro-operation may not use (e.g., never uses) a mask in this implementation. Accordingly, the 4-input transpose operation may re-use the vector mask buffer 301 for the fourth input, and the connection between vector mask buffer 301 port 1 and functional processing unit 303 port 1 may be used for the fourth operand.

FIG. 4 illustrates comparison 400 of the content of a set of vector mask buffers in relation to the content of the vector mask registers in the main vector register files to show how the vector mask buffers may more efficiently distribute vector mask data across the vector processing pipeline in accordance with some of the embodiments described herein. The four lanes (lane0, lane1, lane2, and lane3) illustrated may be the lanes of a vector processing pipeline such as the one illustrated in FIG. 1. The data stored in the vector mask buffers in each of the lanes can comprise a distributed vector mask that has been stored in a different layout from the manner in which it was previously stored in the main vector register file. Table 401 illustrates the content of the four mask registers in the four different lanes of the main vector register file. There is a total of 256 bits of mask data in these registers. In many cases, the mask data required across the vector processing pipeline for a given instruction is often far less than 256 bits.

Tables 402, 403, 404, and 405 show the composition of the data structures that may be stored by the vector mask buffers in different configurations of the vector processing pipeline. Table 402 illustrates the potential distribution of the vector mask data from the main vector register file to the different vector mask buffers for the work case scenario in which all 256 bits of mask data are required. In this case, the vector mask buffers store the content of a logical structure that may be referred to as temporary vector mask 0 (tmp vm0) which may be 8-bit (8b). The 0 and 8 in this situation refer to the values of the lane multiplier (LMUL) and selected element width (SEW). As illustrated, the vector mask buffers for each lane of table 401 are completely full. What is also shown is that the mask data is distributed across the lanes to assure that the mask data lines up with the operands it will mask in the relevant LMUL and SEW configuration.

Tables 403, 404, and 405 show the distribution for a configuration in which the mask data is stored in temporary vector mask 1 (16-bit), temporary vector mask 2 (32-bit), and temporary vector mask 4 (64-bit) respectively. As illustrated, with increasing values of LMUL and decreasing values of SEW, fewer and fewer mask bits are required as fewer and larger data elements are required per operation. However, regardless of how many mask bits are utilized, the relative distribution of the vector mask bits amongst the lanes is maintained to assure the vector mask bits are distributed to be in close proximity to their associated operand data. Hence vector mask bits may be distributed accordingly amongst the lanes using micro-operations that take advantage of the crossbar connecting the lanes.

In general, there are more data bits than there are mask bits. This is because each mask bit is used to mask one data element, and data elements are generally larger than one bit. For example, each data element may be 8-bits such that there is a 1:8 ratio of mask bits to data bits. Accordingly, a 64-bit vector mask register in a main vector register file may contain enough mask bits for eight 64-bit operands in the main vector register file. As such, the functional processing units of a vector processing architecture will consume data bits at a higher rate than mask bits are consumed. Therefore, the vector mask buffer may store mask bits in smaller entries and multiple reads from the vector mask buffer may be used to obtain the mask data as it is needed for multiple operations.

The number of bits per data element may be modified as a vector processing pipeline is in operation. For example, a SEW value in a RISC-V processor may have configurable values which change the number of bits per data element. For example, the number of bits per data element may be 8, 16, 32, or 64 bits. From just this set of examples alone a factor of 8 difference in the number of mask bits required for a given operation may be seen. Accordingly, it may be wasteful to design a vector mask buffer to accommodate the worst-case length of the vector mask bits. Indeed, in the main vector register file in prior art approaches, the vector register is very often not filled. For example, the vector mask register may be a 64-bit register that is only used to store a 16-bit vector mask. Therefore, the vector mask buffer may be a thinner data structure than the main vector register file that is designed to only store, for example, 16 -bits per entry. This eliminates wasted space in most configurations. Furthermore, if the configuration of the vector processing pipeline changes so that more mask bits are required per operand, the mask bits may take up more than one entry in the vector mask buffer and take advantage of the phenomenon in which data is consumed at a higher rate than mask bits by the functional processing units to allow for multiple reads from the vector mask buffer per read of the operand data from the main vector register file.

Figure 5:
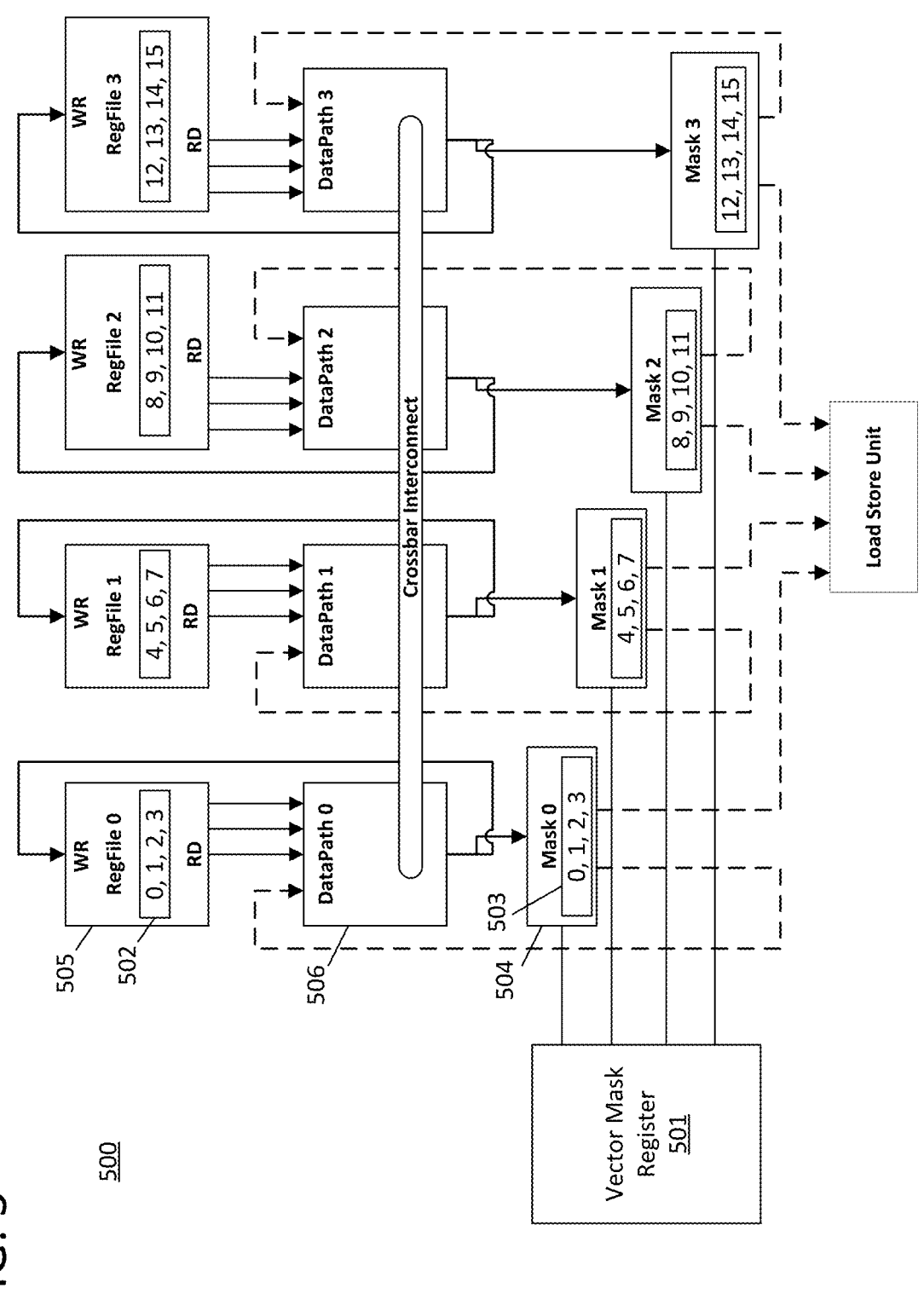
FIG. 5 provides a system in accordance with specific embodiments of the inventions disclosed herein.

FIG. 5 illustrates an example of a system 500 (e.g., a vector processing system). Many features of system 500 may correspond to features of vector processing pipeline 100. System 500 may also incorporate aspects of system 200 and system 300. For example, system 500 may include vector mask register 501, operand data 502, vector mask data 503, vector mask buffer 504 (shown as Mask), vector register file bank 505 (shown as RegFile), and functional processing unit 506 (shown as DataPath). System 500 may also include a Crossbar Interconnect, a Load Store Unit, and connections between features. Vector mask register 501 may be a part of a main vector register file. Vector mask register 501 may be coupled with (e.g., may incorporate, may be separate from, may include) one or more vector mask buffers 504. System 500 may be organized into lanes, similar to vector processing pipeline 100. System 500 may include any quantity of lanes, although four are shown.

In specific embodiments of the invention, vector mask buffer 504 may have multiple entries that are available to store vector mask data 503 as it is loaded. As such, vector mask buffer 504 may store multiple values from the vector mask register 501 of the main vector register file. These entries may be separately addressable such that the functional processing units may be provided with specific stored vector mask data 503 for a given operation at a given time. The ability to store multiple entries of vector mask data 503 provides certain benefits in terms of the ability of vector mask buffer 504 to be a smaller data structure than the main vector register file and to cache vector mask data. System 500 may include a set of pointers or tags which are stored in association with vector mask data 503 in order to keep track of what vector mask data 503 is stored in which entry of vector mask buffer 504.

Vector mask buffer 504 and vector register file bank 505 may have different storage capabilities. Vector mask data 503 and operand data 502 have different segment lengths, different element lengths, and may fill their respective storages at different rates. The bits of vector mask data 503 and bits of operand data 502 may also be processed (e.g., used up, executed, etc.) at different rates. A segment or element of vector mask data 503 may be fewer bits than an associated segment or element of operand data 502.

Vector mask data 503 may be distributed among different vector mask buffers (e.g., including vector mask buffer 504), such that vector mask data 503 and its associated operand data 502 may be stored in devices (e.g., vector mask buffer 504 and a vector register file bank 505 respectively) that are both coupled with the same functional processing unit 506. In other words, vector mask data 503 may be stored in a vector mask buffer 504 proximate to operand data 502 associated with vector mask data 503.

In the example of system 500, each lane may support 64 bits. Vector register file bank 505 may be able to fit four segments of 16-bit elements of operand data 502, for a total storage of 64 bits. Since vector register file bank 505 fits four elements of operand data 502, then vector mask buffer 504 may store four elements of vector mask data 503. Vector mask buffer 504 may refrain from storing more than four elements of vector mask data 503 (even if more vector mask elements may be able to fit), due to the limitations of associated vector register file bank 505. In this way, vector mask data 503 may be stored proximate to operand data 502 across the lanes of system 500.

For example, in lane 0, operand data 502 stored in vector register file bank 505 may correspond to elements 0, 1, 2, and 3 of an operation. Vector mask data 503 stored in vector mask buffer 504 may correspond to the same elements 0, 1, 2, and 3. In another lane, such as lane 1, a second set of operand data stored in a second file register may correspond to elements 4, 5, 6, and 7 of an operation while second vector mask data stored in a second vector mask buffer may correspond to the same elements 4, 5, 6, and 7. In lane 2, a third set of operand data stored in a third file register may correspond to elements 8, 9, 10, and 11 of an operation while a third vector mask data stored in a third vector mask buffer may correspond to the same elements 8, 9, 10, and 11. In lane 3, a fourth set of operand data stored in a fourth file register may correspond to elements 12, 13, 14, and 15 of an operation while fourth vector mask data stored in a fourth vector mask buffer may correspond to the same elements 12, 13, 14, and 15.

In specific embodiments of the inventions disclosed herein, vector mask buffer 504 may be a smaller data structure, in terms of the width of the data structures, as compared to the entries of the vector register file bank 505. For example, the vector register file bank 505 may contain a set of 64-bit registers and vector mask buffer 504 may comprise a set of 32-bit or smaller entries. The smaller data structures will consume less area in the vector processing pipeline and will be less costly to read as compared to larger data structures. The reason the data structures may be smaller depends on the characteristics of how mask bits are used by system 500 (e.g. a vector processing pipeline) and the fact that the size of the data elements in system 500 may be variable depending on the characteristics of system 500.

In specific embodiments, vector mask data 503 that is associated with operand data 502 (e.g., in a lane) may be distributed to vector mask buffer 504, which is proximate to the one or more functional processing units 506 that will operate on operand data 502. The result is more efficient execution of instructions by system 500 as the portion of vector mask data 503 has been distributed to where it will be used ex ante. This reduces micro-operations to shuttle vector mask data 503 from the vector mask register 501 to where the vector mask data 503 will be used as part of the execution of a given instruction.

Figure 6:
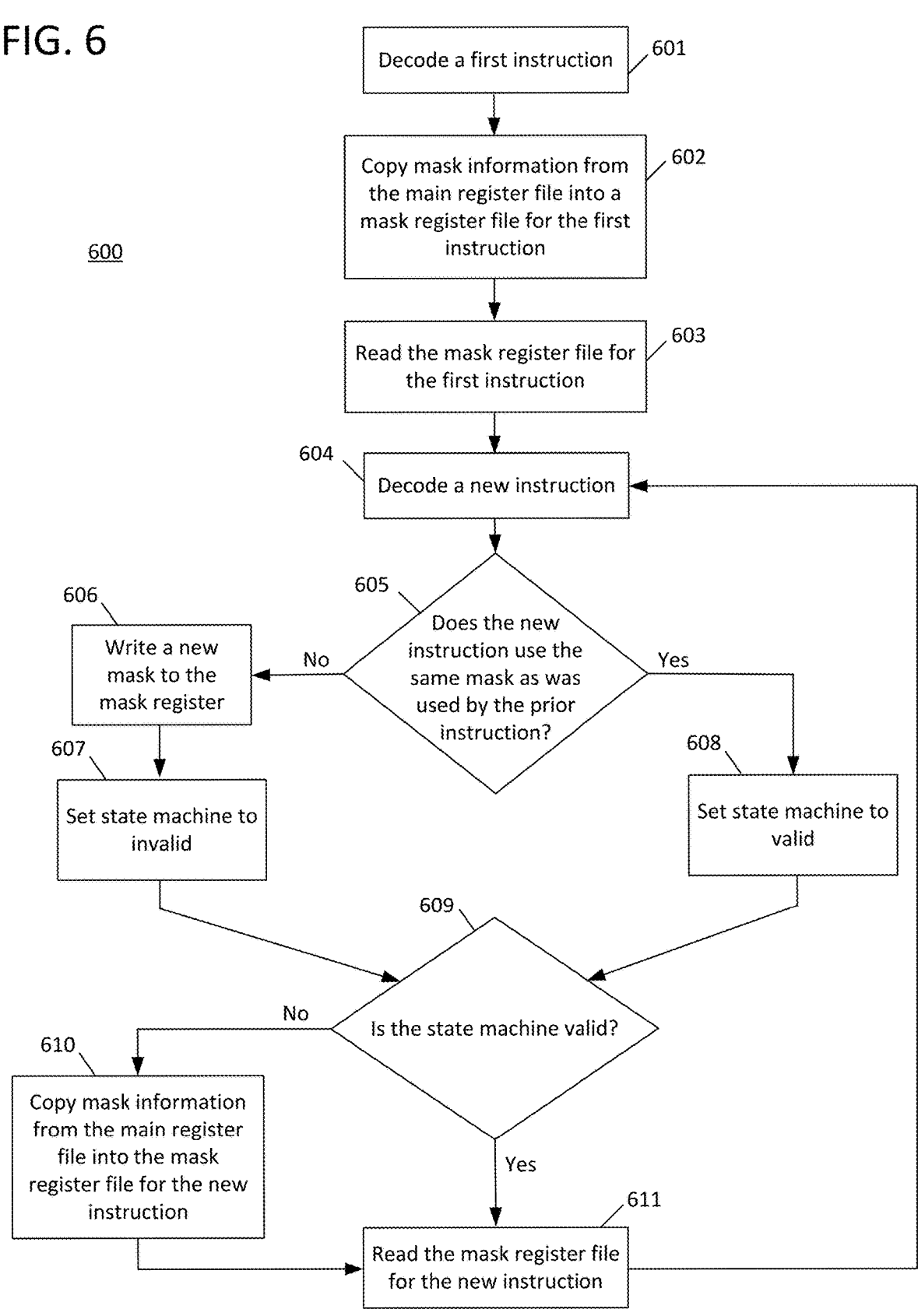
FIG. 6 provides a flow chart of mask buffer caching in accordance with specific embodiments of the inventions disclosed herein.

FIG. 6 is directed to a flow chart 600 of mask buffer caching executed by a system. Mask buffer caching may improve the efficiency of a vector instruction execution pipeline by removing extra processes. The system may include a logic circuit that implements a state machine for a vector processing pipeline.

At 601, a first instruction may be decoded. This instruction may be associated with operand data in the vector instruction execution pipeline.

At 602, mask information may be copied from the main register file into a mask register file. The mask information may be associated with the first instruction. The mask information may be copied as part of a micro-operation. Copying the mask information may be part of the process of executing the first instruction.

At 603, mask information may be read from the mask register file. The mask information may be read as part of a micro-operation. Reading the mask information may be part of the process of executing the first instruction.

At 604, a new instruction may be decoded. The new instruction may be associated with operand data in the vector instruction execution pipeline. The operand data associated with the new instruction may be different than the operand data associated with the first instruction.

At 605, whether or not the new instruction uses the same mask as the prior instruction may be determined.

At 606, if the new instruction does not use the same mask as the prior instruction, then a new mask may be written to the mask register.

At 607, a state machine may be set to invalid. In other words, the state machine may be tripped to invalid after a write to the mask register. In specific embodiments, setting the state machine to invalid may include resetting a bit.

At 608, if the new instruction does use the same mask as the prior instruction, then the state machine may be set to invalid. Additionally, the system may refrain from writing a mask to the mask register. In other words, the state machine may be tripped to valid after the system determines that the new instruction uses the same mask as was used by the prior instruction. In specific embodiments, setting the state machine to valid may include setting a bit. A logic circuit of the system may be configured to delete (e.g., skip the decoding of, convert to a no-operation) a micro-instruction associated with copying a vector mask from the logical vector register to the vector mask buffer. The logic circuit may delete the micro-instruction if the state machine is valid (e.g., the bit is set).

At 609, whether or not the state machine is valid may be determined. The validity of the state machine may be described with a bit associated with a logical vector register in the main vector register file.

At 610, if the state machine is determined to be invalid, then mask information may be copied from the main register file into the mask register file. The mask information may be associated with the new instruction. The mask information that is copied may be the same mask information that was written at 606.

At 611, the mask register file may be read. The mask register file may be associated with the new instruction. If the state machine is invalid, the read mask register file may include information that was written at 606. If the state machine is valid, then the read mask register file may include information that was written during the execution of the first instruction.

After 611, the system may loop back to 604 for another instruction. In this way, the system may compare subsequent instructions. If subsequent instructions share the same mask information, then writing the new mask information for the succeeding instruction to the register may be skipped, as the relevant mask information is already in the register. If there are no more instructions for the system to complete, then instead of looping to 604, the system may exit the process of flow chart 600 and may perform other functions not shown. For example, the system may perform functions associated with completing a set of instructions.

The system may include logic circuits, a state machine, and other features such as those in vector processing pipeline 100. Caching of the vector masks may be conducted using logic circuits which detect if a decoded instruction uses the same mask as was used by a prior instruction, without the mask register being written to in the interim, between the instruction and the prior instruction. For example, the logic circuit may include a state machine in the vector processing architecture which has a state of valid or invalid. The state machine may be tripped to valid after a micro-operation copies data to the vector mask buffer from the mask register and may be tripped to invalid after a write to the mask register. So long as the state machine is valid, a write to the vector mask buffer may not be needed. The logic circuit may conduct various actions in response to detecting that a write to the vector mask buffer has been ordered when the state machine is valid. For example, the logic circuit may delete a micro-operation which controlled writing data to the vector mask buffer from the decode stream.

In a specific example, caching may be conducted by tracking multiple entries in the vector mask register in the main vector register file, and in some cases tracking portions of the vector mask register. For example, if the mask register in the main vector register file had a width of 64 bits the following registers would be tracked:

1. SEW 8, bits 0 to 63
2. SEW 8, bits 64 to 127
3. SEW 8, bits 128 to 191
4. SEW 8, bits 192 to 255
5. SEW 16, bits 0 to 63
6. SEW 16, bits 64 to 127
7. SEW 32, bits 0 to 63
8. SEW 64, bits 0 to 63

The registers may be tracked in a midcore using a standard register renaming algorithm with 8 logical registers mapped to a large number of physical registers. The physical registers may be freed when the local register they are mapped to is overwritten. The front end may maintain one bit per mask register to track its state. For example, the above listed 64-bit mask register design (having 8 different logical registers to track for 8 different configurations of the vector processing pipeline) may have 8 bits to track the status of those registers. Each individual bit may be set whenever the associated register was copied to a vector mask buffer and may be cleared whenever a write to the associated register in the physical vector register of the main vector register file occurred. As described above, if a micro-operation to write to an associated vector mask buffer would otherwise be required, but the corresponding bit is set, the write operation may be deleted. Deleting this write operation may improve the efficiency of the system. For example, deleting the write operation may not consume execution resources.

Figure 7:
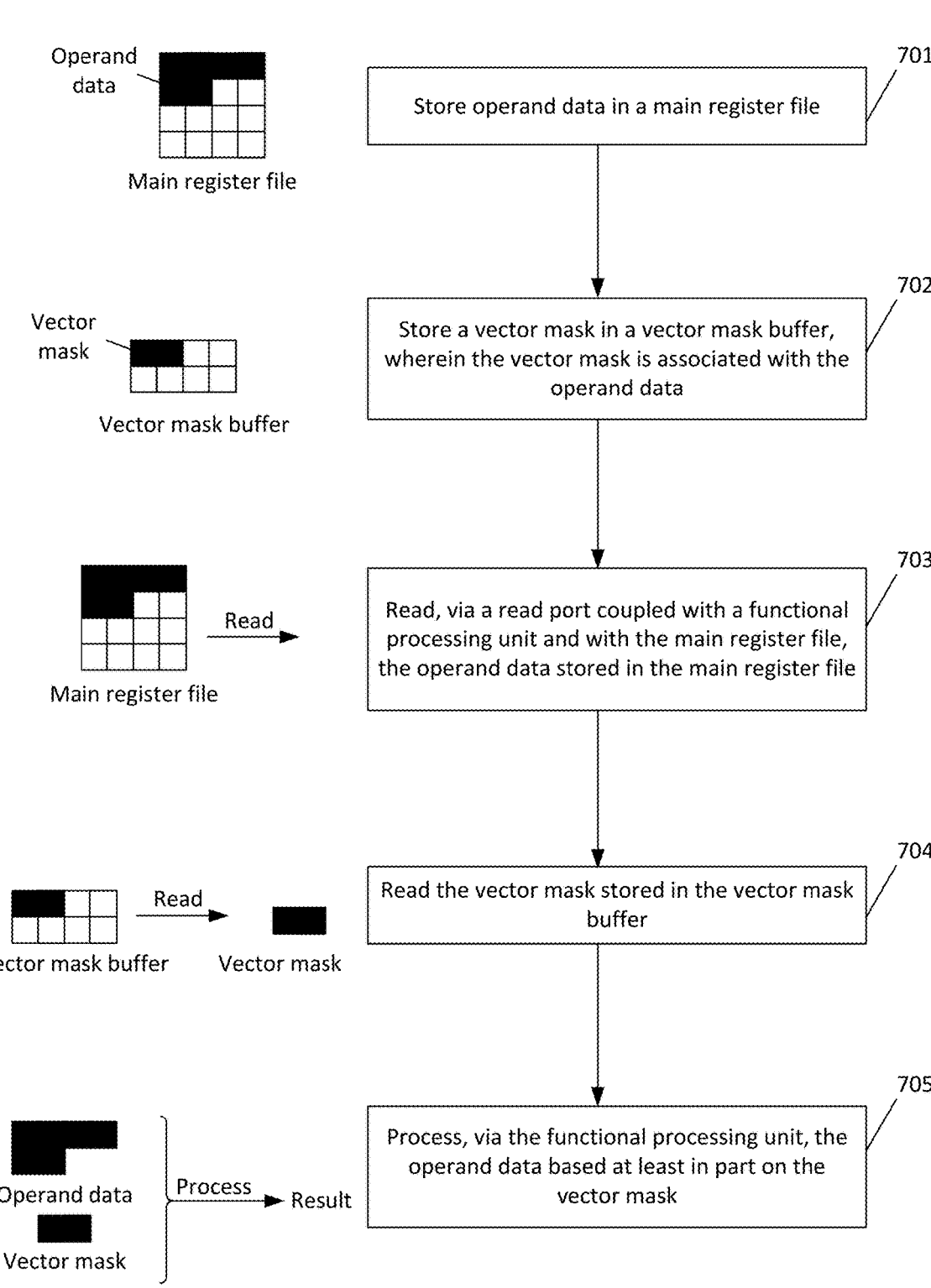
FIG. 7 provides a flow chart of a method for vector processing in accordance with specific embodiments of the inventions disclosed herein.

FIG. 7 illustrates an example of method 700 for vector processing in accordance with specific embodiments disclosed herein. Portions of method 700 may be rearranged, omitted, duplicated, or a combination thereof, from the format illustrated in the figure.

At 701, operand data may be stored in a main register file. The operand data may have any quantity of elements and any quantity of segments. The main vector register file may have a set of registers.

At 702, a vector mask may be stored in a vector mask buffer. The vector mask may be associated with the operand data. For example, the vector mask may correspond to the operand data for a given instruction. The vector mask buffer may have a set of entries. The data width of the set of entries may be smaller than the data width of the set of registers of the main vector register file. A load store unit may be coupled to the vector mask buffer.

At 703, the operand data may be read. The operand data may be read via a read port. The read port may be coupled with a functional processing unit and with the main register file.

At 704, the vector mask may be read. The vector mask may be read from the vector mask buffer, where the vector mask was stored at 702. The vector mask buffer may be coupled to the functional processing unit via a port.

At 705, the operand data may be processed. The operand data may be processed via the functional processing unit and may be processed based on the vector mask.

FIG. 8 illustrates an example of method 800 for vector processing in accordance with specific embodiments disclosed herein. Method 800 may be a continuation of method

700. Portions of method 800 may be interleaved within method 700. Portions of method 800 may be rearranged, omitted, duplicated, or a combination thereof, from the format illustrated in the figure.

At 801, mask information may be received at the functional processing unit. The mask information may be from the vector mask buffer and may be received via the port of the functional processing unit. The port of the functional processing unit may be a write back port. The main vector register file may be coupled to the functional processing unit via the port (e.g., write back port).

At 802, the operand data may be received at the functional processing unit. The operand data may be from the main vector register file. The mask information of 801 and the operand data may be received at the functional processing unit during a same time step (e.g., at the same time).

At 803, a set of vector mask buffers may be distributed. The vector mask buffer may be in the set of vector mask buffers. The functional processing unit may be in a set of functional processing units. The set of functional processing units may form a set of lanes of a vector processing pipeline. The vector mask buffers in the set of vector mask buffers may be distributed across the lanes of the set of lanes in a one-to-one correspondence.

At 804, data may be distributed across the lanes in the set of lanes of the vector processing pipeline. The data may be vector mask data. The data may be distributed using a crossbar that connects the lanes in the set of lanes.

FIG. 9 illustrates an example of method 900 for vector processing in accordance with specific embodiments disclosed herein. Method 900 may be a continuation of method 700, of method 800, or a combination thereof. Portions of method 900 may be interleaved within method 700 and method 800. Portions of method 900 may be rearranged, omitted, duplicated, or a combination thereof, from the format illustrated in the figure.

At 901, a copy from a logical vector register to the vector mask buffer may be detected.

At 902, a bit may be set. The bit may be associated with a logical vector in the main vector register file. The bit may be set via a state machine. A logic circuit may implement the state machine. The bit may be associated with the logical vector register in the main vector register file. The bit may be set upon detecting the copy at 901.

At 903, a micro-instruction may be deleted. The micro-instruction may relate to copying (e.g., copying a vector mask) from the logical vector register to the vector mask buffer. The logic circuit may delete the micro-instruction. Deleting the micro-instruction may be based on setting the bit at 902.

At 904, a write may be detected. The write may be to the logical vector and may include a vector mask.

At 905, the bit may be reset. The bit may be reset by the state machine. Resetting the bit may be based on detecting the write at 904.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A vector processing pipeline comprising:
a main vector register file storing operand data and having a read port;
a vector mask buffer storing a vector mask, wherein the vector mask is associated with the operand data;
a functional processing unit coupled to the main vector register file via the read port and coupled to the vector mask buffer, wherein the functional processing unit forms a lane in a set of lanes of the vector processing pipeline; and
a crossbar connecting each lane in the set of lanes of the vector processing pipeline, wherein the vector processing pipeline is configured to route and write the vector mask to the vector mask buffer using the crossbar.

2. The vector processing pipeline of claim 1, wherein:
the main vector register file has a set of registers;
the vector mask buffer has a set of entries; and
a data width of the set of registers is larger than a data width of the set of entries.

3. The vector processing pipeline of claim 1, further comprising:
a port of the functional processing unit;
wherein the vector mask buffer is coupled to the functional processing unit via the port.

4. The vector processing pipeline of claim 3, wherein:
the functional processing unit receives the vector mask from the vector mask buffer via the port of the functional processing unit and receives the operand data from the main vector register file during a same time step.

5. The vector processing pipeline of claim 3, wherein:
the port of the functional processing unit is a write back port of the functional processing unit; and
the main vector register file is coupled to the functional processing unit via the write back port.

6. The vector processing pipeline of claim 1, further comprising:
a set of vector mask buffers, wherein the vector mask buffer is in the set of vector mask buffers; and
a set of functional processing units, wherein the functional processing unit is in the set of functional processing units, and wherein the set of functional processing units form the set of lanes of the vector processing pipeline;
wherein vector mask buffers in the set of vector mask buffers are distributed across the lanes in the set of lanes.

7. The vector processing pipeline of claim 6, further comprising:
a write back port of the main vector register file, wherein the vector processing pipeline is configured to route and write back the operand data to the main vector register file using the crossbar and the write back port.

8. The vector processing pipeline of claim 6, further comprising:
a set of main vector register files including the main vector register file;
wherein the vector mask in the vector mask buffer is part of a distributed vector mask that is stored in the set of vector mask buffers, and the distributed vector mask was stored in a different layout in one of: (i) the main vector register file; and (ii) the set of main vector register files.

9. The vector processing pipeline of claim 1, further comprising:

a load store unit;
wherein the load store unit is coupled to the vector mask buffer.

10. The vector processing pipeline of claim 1, further comprising:
a logic circuit that implements a state machine for the vector processing pipeline; and
a bit associated with a logical vector register in the main vector register file;
wherein the state machine is configured to:
set the bit upon detecting a copy from the logical vector register to the vector mask buffer; and
reset the bit upon detecting a write to the logical vector register; and
wherein the logic circuit is configured to delete a micro-instruction to copy from the logical vector register to the vector mask buffer when the bit is set.

11. The vector processing pipeline of claim 1, further comprising:
second operand data, the second operand data being stored in the vector mask buffer, wherein the operand data and the second operand data are associated with a same instruction.

12. A method for vector processing, comprising:
storing operand data in a main vector register file;
storing a vector mask in a vector mask buffer, wherein the vector mask is associated with the operand data;
reading, via a read port coupled with a functional processing unit and with the main vector register file, the operand data stored in the main vector register file;
reading the vector mask stored in the vector mask buffer;
processing, via the functional processing unit, the operand data based at least in part on the vector mask, wherein the functional processing unit forms a lane in a set of lanes of a vector processing pipeline;
distributing, via a crossbar, data across the lanes in the set of lanes of the vector processing pipeline; and
routing and writing the vector mask to the vector mask buffer using the crossbar.

13. The method for vector processing of claim 12, wherein:
the main vector register file has a set of registers;
the vector mask buffer has a set of entries; and
a data width of the set of registers is larger than a data width of the set of entries.

14. The method for vector processing of claim 12, wherein:
the vector mask buffer is coupled to the functional processing unit via a port of the functional processing unit.

15. The method for vector processing of claim 14, further comprising:
receiving, at the functional processing unit, the vector mask from the vector mask buffer via the port of the functional processing unit; and
receiving, at the functional processing unit, the operand data from the main vector register file, wherein the vector mask and the operand data are received during a same time step.

16. The method for vector processing of claim 14, wherein:
the port of the functional processing unit is a write back port of the functional processing unit; and
the main vector register file is coupled to the functional processing unit via the write back port.

17. The method for vector processing of claim 12, wherein:
the vector mask buffer is in a set of vector mask buffers;

the functional processing unit is in a set of functional processing units and the set of functional processing units form the set of lanes of the vector processing pipeline;

the set of lanes include a set of main vector register files that are distributed across lanes in the set of lanes;

the set of main vector register files includes the main vector register file; and vector mask buffers in the set of vector mask buffers are distributed across the lanes in the set of lanes.

18. The method of vector processing of claim 17, further comprising:

routing and writing back the operand data to the main vector register file using the crossbar and a write back port of the main vector register file;

wherein routing and writing the vector mask to the vector mask buffer uses a write port of the vector mask buffer.

19. The method of vector processing of claim 17, wherein:

the main vector register file is in the set of main vector register files;

the vector mask in the vector mask buffer is part of a distributed vector mask that is stored in the set of vector mask buffers; and the distributed vector mask was stored in a different layout in one of: (i) the main vector register file; and (ii) the set of main vector register files.

20. The method for vector processing of claim 12, wherein:

a load store unit is coupled to the vector mask buffer.

21. The method for vector processing of claim 12, further comprising:

detecting a copy from a logical vector register to the vector mask buffer;

setting, via a state machine, a bit associated with the logical vector register in the main vector register file, wherein a logic circuit implements the state machine, the bit is associated with the logical vector register in the main vector register file, and the bit is set upon detecting the copy from the logical vector register to the vector mask buffer;

deleting, via the logic circuit and based at least in part on setting the bit, a micro-instruction to copy from the logical vector register to the vector mask buffer;

detecting a write to the logical vector register; and resetting, via the state machine, the bit based at least in part on detecting the write to the logical vector register.

22. A vector processing pipeline comprising:

a main vector register file storing operand data;

a functional processing unit, wherein the functional processing unit forms a lane in a set of lanes of the vector processing pipeline;

one or more first read ports associated with the main vector register file and coupled with the functional processing unit;

a vector mask buffer storing a vector mask, wherein the vector mask is associated with the operand data;

one or more second read ports associated with the vector mask buffer and coupled with the functional processing unit; and a crossbar connecting each lane in the set of lanes of the vector processing pipeline, wherein the vector processing pipeline is configured to route and write the vector mask to the vector mask buffer using the crossbar.

23. A vector processing pipeline comprising:

a main vector register file storing operand data and having a read port;

a vector mask buffer storing a vector mask, wherein the vector mask is associated with the operand data;

a functional processing unit coupled to the main vector register file via the read port and coupled to the vector mask buffer;

a logic circuit that implements a state machine for the vector processing pipeline; and a bit associated with a logical vector register in the main vector register file;

wherein the state machine is configured to:

set the bit upon detecting a copy from the logical vector register to the vector mask buffer; and reset the bit upon detecting a write to the logical vector register; and wherein the logic circuit is configured to delete a micro-instruction to copy from the logical vector register to the vector mask buffer when the bit is set.

24. A method for vector processing, comprising:

storing operand data in a main vector register file;

storing a vector mask in a vector mask buffer, wherein the vector mask is associated with the operand data;

reading, via a read port coupled with a functional processing unit and with the main vector register file, the operand data stored in the main vector register file;

reading the vector mask stored in the vector mask buffer;

processing, via the functional processing unit, the operand data based at least in part on the vector mask;

detecting a copy from a logical vector register to the vector mask buffer;

setting, via a state machine, a bit associated with the logical vector register in the main vector register file, wherein a logic circuit implements the state machine, the bit is associated with the logical vector register in the main vector register file, and the bit is set upon detecting the copy from the logical vector register to the vector mask buffer;

deleting, via the logic circuit and based at least in part on setting the bit, a micro-instruction to copy from the logical vector register to the vector mask buffer;

detecting a write to the logical vector register; and resetting, via the state machine, the bit based at least in part on detecting the write to the logical vector register.

25. A vector processing pipeline comprising:

a main vector register file storing operand data;

a functional processing unit;

one or more first read ports associated with the main vector register file and coupled with the functional processing unit;

a vector mask buffer storing a vector mask, wherein the vector mask is associated with the operand data;

one or more second read ports associated with the vector mask buffer and coupled with the functional processing unit;

a logic circuit that implements a state machine for the vector processing pipeline; and a bit associated with a logical vector register in the main vector register file;

wherein the state machine is configured to:

set the bit upon detecting a copy from the logical vector register to the vector mask buffer; and reset the bit upon detecting a write to the logical vector register; and wherein the logic circuit is configured to delete a micro-instruction to copy from the logical vector register to the vector mask buffer when the bit is set.

* * * * *